US006949265B1

(12) United States Patent
Schaefer et al.

(10) Patent No.: US 6,949,265 B1
(45) Date of Patent: Sep. 27, 2005

(54) LOW TEMPERATURE RENDERING PROCESS (75) Inventors: Daniel L. Schaefer, Maize, KS (US); Jerome D. Leising, Shorewood, MN (US); M. James Riemann, Derby, KS (US)

(73) Assignee: Cargill, Incorporated, Minneapolis, MN (US)

( * ) Notice: Subject to any disclaimer, the term of this patent is extended or adjusted under 35 U.S.C. 154(b) by 994 days.

(21) Appl. No.: 09/708,925

(22) Filed: Nov. 8, 2000

Related U.S. Application Data (63) Continuation of application No. 09/183,184, filed on Oct. 30, 1998, now Pat. No. 6,159,515, which is a continuation-in-part of application No. 08/895,112, filed on Jul. 16, 1997, now Pat. No. 5,965,184, which is a continuation of application No. 08/506,612, filed on Jul. 25, 1995, now Pat. No. 5,725,897.
(60) Provisional application No. 60/000,839, filed on Jul. 3, 1995.

(51) Int. Cl.$^7$ .............................. A23L 1/31; A23L 1/313
(52) U.S. Cl. ....................... 426/417; 426/478; 426/480; 426/641
(58) Field of Search ................................ 426/417, 641, 426/478, 480; 554/8

(56) References Cited

U.S. PATENT DOCUMENTS

| | | |
|---|---|---|
| 603,082 A | 4/1898 | Henkel et al. |
| 1,007,908 A | 11/1911 | Ahrens |
| 1,146,589 A | 7/1915 | Morrison |
| 1,850,031 A | 3/1932 | Rayson |
| 1,848,596 A | 8/1932 | Allbright |
| 2,060,423 A | 11/1936 | McKee et al. |
| 2,467,529 A | 4/1949 | Hormel |
| 2,631,520 A | 3/1953 | Geerling |
| 2,745,856 A | 5/1956 | Dayen et al. |
| 2,780,968 A | 2/1957 | Heys |
| 2,978,738 A | 4/1961 | Jönsson |
| 3,008,831 A | 11/1961 | Christianson |
| 3,013,887 A | 12/1961 | Eolkin |
| 3,020,160 A | 2/1962 | Downing et al. |
| 3,023,694 A | 3/1962 | Burns |
| 3,058,830 A | 10/1962 | Christianson |
| 3,078,165 A | 2/1963 | Alberts |
| 3,078,287 A | 2/1963 | Downing |
| 3,135,016 A | 6/1964 | Erkstam et al. |
| 3,138,088 A | 6/1964 | Foth |
| 3,141,774 A | 7/1964 | Little |
| 3,177,080 A | 4/1965 | Alberts |
| 3,272,632 A | 9/1966 | Speer |
| 3,291,616 A | 12/1966 | Brissey |
| 3,345,353 A | 10/1967 | Klubien |
| 3,346,393 A | 10/1967 | Bradford |
| 3,352,841 A | 11/1967 | Lyon |
| 3,471,299 A | 10/1969 | Duckworth et al. |
| 3,522,058 A | 7/1970 | Libby |
| 3,532,508 A | 10/1970 | Ott |
| 3,601,039 A | 8/1971 | Schover |
| 3,613,564 A | 10/1971 | Adamski et al. |
| 3,631,563 A | 1/1972 | Snowden |
| 3,663,233 A | 5/1972 | Keszler |
| 3,666,499 A | 5/1972 | Isnor |
| 3,694,856 A | 10/1972 | Kaufman et al. |
| 3,705,813 A | 12/1972 | Vogel |
| 3,780,191 A | 12/1973 | Langer et al. |
| 3,900,575 A | 8/1975 | Rapoport |
| 3,904,770 A | 9/1975 | Hale et al. |
| 3,906,118 A | 9/1975 | McFarland |
| 3,934,044 A | 1/1976 | Busch et al. |
| 3,961,090 A | 6/1976 | Weiner et al. |
| 3,979,296 A | 9/1976 | Bastgen |
| 3,996,386 A | 12/1976 | Malkki et al. |
| 4,045,579 A | 8/1977 | Rogers |
| 4,098,095 A | 7/1978 | Roth |
| 4,119,735 A | 10/1978 | Maher et al. |
| 4,122,208 A | 10/1978 | Tronstad |
| 4,137,335 A | 1/1979 | Holm et al. |
| 4,156,384 A | 5/1979 | Hinds, Jr. et al. |
| 4,163,009 A | 7/1979 | Filstrup |
| 4,186,216 A | 1/1980 | Roth |
| 4,201,302 A | 5/1980 | Roth |
| 4,216,239 A | 8/1980 | Gloppestad |
| 4,234,537 A | 11/1980 | Hersom et al. |
| 4,240,591 A | 12/1980 | Schnell |
| 4,254,152 A | 3/1981 | Janovtchik |
| 4,255,459 A | 3/1981 | Glen |
| 4,294,860 A | 10/1981 | Roth |

(Continued)

FOREIGN PATENT DOCUMENTS

| | | |
|---|---|---|
| FR | 2 603 775 | 3/1988 |
| GB | 338768 | 11/1930 |

(Continued)

OTHER PUBLICATIONS

Copy of International Search Report mailed Nov. 20, 1996 for application PCT/US96/11019.

(Continued)

Primary Examiner—Arthur L. Corbin
(74) Attorney, Agent, or Firm—Merchant & Gould P.C.

(57) ABSTRACT

A low temperature rendering process for converting animal trimmings to meat product which can be classified as finely textured meal. The low temperature rendering process includes steps of surface treating the trimmings to kill organisms which may be present on the surface of the trimmings; heating the surface treated animal trimmings in a heat exchanger having a first-in and first-out arrangement to form a heated slurry; separating a solids stream and a liquids stream from the heated slurry, the solids stream containing an increased amount of protein and the liquids stream containing an increased amount of tallow, separating a heavy phase and a light phase from the liquids stream, the heavy phase containing an increased amount of moisture and water soluble protein, and the light phase containing an increased amount of tallow, and combining the solids stream and the heavy phase to form a meat product.

14 Claims, 5 Drawing Sheets

U.S. PATENT DOCUMENTS

| | | |
|---|---|---|
| 4,331,695 A | 5/1982 | Zosel |
| 4,337,627 A | 7/1982 | Roth |
| 4,342,788 A | 8/1982 | Clatfelter |
| 4,344,976 A | 8/1982 | Bladh |
| 4,361,590 A | 11/1982 | Wojcik |
| 4,389,423 A | 6/1983 | Madsen |
| 4,405,651 A | 9/1983 | Entremont et al. |
| 4,473,004 A | 9/1984 | Wells et al. |
| 4,525,368 A | 6/1985 | Bengtsson et al. |
| 4,539,212 A | 9/1985 | Hunter |
| 4,556,572 A | 12/1985 | Kaufman, Jr. et al. |
| 4,567,050 A | 1/1986 | Roth |
| 4,636,395 A | 1/1987 | Robinson, Jr. et al. |
| 4,731,908 A | 3/1988 | Thorsen |
| 4,759,943 A | 7/1988 | Ross, Jr. |
| 4,760,780 A | 8/1988 | Silvestrini et al. |
| 4,849,237 A | 7/1989 | Hurst |
| 4,902,522 A | 2/1990 | Rudibaugh |
| RE33,174 E | 3/1990 | Whittle |
| 4,927,653 A | 5/1990 | Manvell |
| 4,933,200 A | 6/1990 | Shimizu |
| 4,948,607 A | 8/1990 | Margolis |
| 4,966,072 A | 10/1990 | Ellis-Brown |
| 5,041,055 A | 8/1991 | Roth |
| 5,043,175 A | 8/1991 | Bayley et al. |
| 5,045,021 A | 9/1991 | Borup |
| 5,072,663 A | 12/1991 | Ellis-Brown |
| 5,082,678 A | 1/1992 | Margolis |
| 5,093,140 A | 3/1992 | Watanabe |
| 5,167,977 A | 12/1992 | Gamay |
| 5,184,538 A | 2/1993 | Ledet |
| 5,221,554 A | 6/1993 | Gamay |
| 5,232,725 A | 8/1993 | Roderbourg et al. |
| 5,281,428 A | 1/1994 | Morgan |
| 5,366,746 A | 11/1994 | Mendenhall |
| 5,382,444 A | 1/1995 | Roehrig et al. |
| 5,405,632 A | 4/1995 | Mahboob |
| 5,439,694 A | 8/1995 | Morris, Jr. |
| 5,458,901 A | 10/1995 | Engler et al. |
| 5,470,597 A | 11/1995 | Mendenhall |
| 5,474,790 A | 12/1995 | Franklin |
| 5,503,594 A | 4/1996 | Karubian et al. |
| 5,514,396 A | 5/1996 | Mahboob |
| 5,552,173 A | 9/1996 | Singh et al. |
| 5,576,047 A | 11/1996 | Margolis |
| 5,607,349 A | 3/1997 | Karubian et al. |
| 5,622,101 A | 4/1997 | Margolis |
| 5,650,187 A | 7/1997 | Franklin et al. |
| 5,651,730 A | 7/1997 | McGinnis et al. |
| 5,688,549 A | 11/1997 | Roehrig et al. |
| 5,698,255 A | 12/1997 | Roehrig et al. |
| 5,711,981 A | 1/1998 | Wilson et al. |
| 5,725,897 A | 3/1998 | Schaefer et al. |

FOREIGN PATENT DOCUMENTS

| | | |
|---|---|---|
| GB | 1044043 | 9/1966 |
| GB | 1072430 | 6/1967 |
| GB | 1199557 | 7/1970 |
| GB | 2 182 461 A | 5/1987 |
| GB | 2 240 912 A | 8/1991 |
| GB | 2 264 220 A | 8/1993 |
| WO | WO 82/01719 | 5/1982 |
| WO | WO93/09679 | 5/1993 |

OTHER PUBLICATIONS

Gill, C. O., "The hygienic and organoleptic qualities of ground beef prepared manufacturing beef pasteurized by immersion in hot water". *Meat Science*, 46:67–75 (1997).

Humphrey, T. J. et al., "The effect of pH adjustment on the microbiology of chicken scald–tank water with particular reference to the death rate of salmonellas", *Journal of Applied Bacteriology*, 51:517–527 (1981).

Morton, I. D., "Edible tallow, lard and partially defatted tissues", Ch. 12; pp. 275–302 (source and date unknown).

Phebus, R. D., et al., "Comparison of steam pasteurization and other methods for reduction of pathogens on surfaces of freshly slaughtered beef", *Journal of Food Protection*, 60(5);476, 478, 480, 484 (1997).

Sachindra, N. M. et al., "Reduction in microbial load on buffalo meat by hot water dip treatment", *Meat Science*, 48(1/2):149–157 (1998).

Thompson, J. E. et al., "Phosphate and heat treatments to control salmonella and reduce spoilage and rancidity on broiler carcasses", *Poultry Science*, 58:139–143 (1979).

LOW TEMPERATURE RENDERING PROCESS

CROSS REFERENCE TO RELATED APPLICATIONS

"This application is a continuation of application Ser. No. 09/183,184, filed Oct. 30, 1998, which is now U.S. Pat. No. 6,159,515 which is a continuation-in-part of application Ser. No. 08/895,112, filed Jul. 16, 1997, now U.S. Pat. No. 5,965,184, which is a continuation of application Ser. No.08/506,612, filed Jul. 25, 1995, now U.S. Pat. No. 5,725,897, and claims benefit of provisional application Serial No. 60/000,839, filed Jul. 3, 1995, application(s) are incorporated herein by reference."

FIELD OF THE INVENTION

The present invention relates to an improved low temperature rendering process for recovering meat product from animal trimmings, and to a meat product produced by low temperature rendering.

BACKGROUND OF THE INVENTION

Low temperature rendering processes have been used to separate protein from fatty tissue in animal trimmings. Low temperature rendering processes are described in, for example, U.S. Pat. Nos. 3,008,831; 3,020,160; and 3,078,165. The processes generally involve comminuting fatty tissue from animals, such as hogs or cattle, to form a semi-slid slurry or meat emulsion, heating the slurry or emulsion to melt the fat, and then separating the fat and protein by centrifugation. The protein can then be used as an ingredient in processed meat products such as sausage and other cured and processed meats.

As reported in U. S. Pat. No. 3,219,616 to Brissey, it has been found that the protein or meat provided by prior art low temperature rendering processes suffer from undesirable flavor changes shortly after production. In order to reduce the flavor changes after low temperature rendering processes, this patent teaches using a heme-conditioning agent which reacts or combines with the heme pigments of the meat to reduce the activity of the heme pigments which catalyzes the development of off-flavor.

The government provides that a certain quality of meat product obtained from animal tings can be used undeclared in meat products of the same species. For example, "finely textured beef" and "lean finely textured beef" can be used in ground beef without being declared on the label. "Finely textured meat" is required to have a fat content of less than 30% ; a protein content of greater than 14% , by weight; a protein efficiency ratio (PER) of 2.5 or higher , or an essential amino acids (EAA) content of 33% of the total amino acids or higher, must be prepared in a federally inspected plant; must not have a product temperature during processing exceeding 43° C. (about 110° F.); must be frozen in less than 30 minutes after processing; must not allow a significant increase in bacterial numbers; and must not be treated with chemicals or additives. "Lean finely textured meat" is required to have a fat content of less than 10%, by weight , and complies with the other requirements of "finely textured meat."

SUMMARY OF THE INVENTION

A low temperature rendering process for converting animal trimmings to meat product is provided by the present invention The low temperature rendering process includes the process steps of: providing animal trimmings having an average size of between about 0.25 lbs and about 12 lbs; surface treating said animal trimmings with a heat transfer fluid provided at a temperature of between about 80° C. and about 150° C. for between about 25 seconds and about 150 seconds to provide surface treated animal trimmings; heating the surface treated animal trimmings in a heat exchanger having a first-in and first-out arrangement to a temperature in the range of about 32° C. to about 50° C. (about 90° F. to about 120° F.) to form a heated slurry; separating a solids stream and a liquids stream from the heated slurry, the solids stream containing an increased weight percent of protein and moisture compared with the weight percent of protein and moisture in the heated slurry, and the liquids stream containing an increased weight percent of tallow compared with the weight percent of tallow in the heated slurry, separating a heavy phase and a light phase from the liquids stream, the heavy phase containing an increased weight percent of moisture and water soluble protein compared with the weight percent of moisture and water soluble protein in the liquids stream, and the light phase containing an increased weight percent of tallow compared with the weight percent of tallow in the liquids stream; and combining the solids stream and the heavy phase to form a meat product. Preferably, the meat product has a fat content of less than 30%; a protein content of greater than 14%; and a protein efficiency ratio of 2.5 or higher, and an essential amino acids content of at least 33% of the total amino acids.

The heat transfer fluid provided in the surface treating step is preferably water or tallow. When the heat transfer fluid is water, it is preferably provided at a temperature of between about 80° C. and about 110° C. Because of the high heat transfer coefficient of water, the step of surface treating with water preferably does not exceed 50 seconds. When tallow is used as the heat transfer fluid, it should be appreciated that it has a lower heat transfer coefficient than water. According, if it is provided at a lower temperature, i.e., between about 80° C. and about 120° C., it may be appropriate to extend the length of time for surface treating to beyond 50 seconds. For example, to a period of less than about 150 seconds. Alternatively, the tallow can be provided at a higher temperature, such as between about 115° C. and about 150° C.

In a preferred embodiment, the animal trimmings are processed, after the surface treating step, in closed environment so that atmospheric oxidation is in addition, the animal trimmings are preferably not heated above 43° C. (about 110° F.) in the heat exchanger, and are not treated with chemicals or additives.

The step of separating a solids stream and a liquids steam from the heated slurry can occur in a decanter, and the step of separating a heavy phase and a light phase from the liquids stream can occur in a centrifuge, and the meat product can be frozen within about 30 minutes of heating the animal trimmings in a heat exchanger. The meat product prepared by the low temperature rendering process is preferably finely textured meat. Preferably, the low temperature rendering process is continuous, but can be modified for batch or semi-batch operations.

A finely textured meat product prepared by low temperature rendering is provided by the present invention. The meat product has been surface treated to kill bacteria which may have been present, and preferably has a fat content of between about 1 and 10% by weight, a protein content of between about 18 and 21% by weight, a moisture content of between about 72 and 77% by weight, and an essential amino acids content of greater than 33% by weight More preferably, the meat product has a fat content of between about 2 and 7% by weight. In particular, the finely textured meat product can have a color which closely resembles uncooked lean meat. Accordingly, the color can be pink to red.

A low temperature rendering process according to the invention can be practiced by the steps of : surface treating animal trimmings with a heat transfer fluid provided at a temperature of between about 80° C. and about 150° C. for between about 25 seconds and about 150 seconds to provide surface treated animal trimmings; heating the surface treated animal trimmings in a heat exchanger having a first-in and first-out arrangement to a temperature in the range of about 30° C. and about 50° C. to form a heated slurry, and feeding the heated slurry to a decanter and separating the heated slurry into a solids stream and a liquids stream, the solids stream containing an increased weight-percent of protein and moisture compared with the weight-percent of protein and moisture in the heated slurry, and the liquids steam containing an increased weight-percent of tallow, water-soluble protein, and moisture compared with the weight percent of tallow, water-soluble protein, and moisture provided in the heated slurry. Preferably, the animal trimmings are provided with an average size of between about 0.25 lbs and about 12 lbs. The low temperature rendering process can include an additional step of feeding the liquids stream from the decanter to a separator and separating the liquids stream into a heavy phase and a light phase, the heavy phase containing an increased weight-percent of moisture and water-soluble protein compared with the weight percent of moisture and water-soluble protein in the liquids stream, and the light phase containing an increased weight percent of tallow compared with the weight-percent of tallow in the liquids stream. The solids stream and the heavy phase can be combined to provide a meat product.

DETAILED DESCRIPTION OF THE INVENTION

The present invention relates to a method for processing animal trimmings to recover meat product low in fat content and high in protein and essential amino acid content. It should be kept in mind that "meat product" describes protein-containing product which is suitable for human consumption as meat because it contain a certain amount of protein. Generally, "animal trimmings" refers to the tissue cut away from conventional cuts or parts of the carcasses of meat producing animals during butchering operations in packing houses and the like. The conventional cuts or parts are generally sold directly to consumers or her processed by, for example, grinding into ground beef. The tissue remaining after the conventional cuts are removed, or after the conventional cuts have been further trimmed, generally has a fat content which is too high for human consumption as meat, but contains protein which can be recovered.

According to the present invention, once the animal trimmings are removed from the carcass they are preferably forwarded directly to the low temperature rendering process of the present invention. Alternatively, the animal trimmings can be cooled and stored prior to processing. The temperature of the animal trimmings upon removal from the carcasses is usually between about 30° C. and about 40° C., which corresponds to the temperature at which the carcasses are stored prior to butchering. Warmer or cooler animal trimmings can be used in the low temperature rendering process of the present invention. It is anticipated that in the future, regulations will allow carcasses to be butchered immediately after removal of the hide, thereby forgoing cooling and storing the carcasses. This will provide warmer animal trimmings which will reduce subsequent heating costs. As will be apparent from the following description, it is important to control the temperature of the processing material throughout the low temperature rendering process of the present invention.

The animal trimmings can include any part of an animal which is trimmed away from the carcass of the animal or the cuts. The animal trimmings can include all the parts normally found in an animal, including adipose tissue, fat, lean, ligaments, tendons, bone parts, and the like. It is generally desirable that if components other than fat, lean, and moisture are present, they are present in small quantities and/or can be removed in the desinewing step or by hand, if desired, or can be left therein if their presence does not adversely effect the properties of the meat product. If large amounts of certain components are present, it may be desirable to have them removed by conventional seperation techniques prior to processing according to the present invention. For example, it is generally desirable not to have large amounts of bone present or large amounts of low quality ligaments.

It should be kept in mind that "meat producing animals" are animals which are conventionally processed to provide meat. Such animals include beef, pork, poultry, lamb, deer, fish, and the like. The lean material can be referred to as protein-containing material, and can be in the form of water soluble protein which tends to give the meat its color, salt soluble protein which include muscle fiber, and nonsoluble protein which are generally the connective tie which surrounds muscle fiber and which attach the muscle fibers to ligaments. Of particular interest for purposes of the present invention is the presence of the water soluble protein and the salt soluble protein in the fatty tissue within the fat trimming By separating this material from the animal trimmings, a high quality meat product can be provided.

Animal trimmings which can be used in the present invention preferably have an average fat content of between about 50 and 80% by weight, and more preferably and 40% by weight. In order to ensure reliable and consistent results, it is preferable that the lean content of the animal rings is at least 37% by weight, and even more preferably at least 39% by weight It should be kept in mind that the lean content includes protein and moisture.

It is an advantage of the present invention that high quality meat product can be obtained without adding chemicals or additives to the animal trimmings at any time during the processing thereof. In particular, no water or preservative needs to be added during the method of the present invention in order to provide a meat product having a high moisture and protein content and a low fat content The process steps provided by the following description can be referred to as a closed system since the animal trimmings can be processed without being exposed to the atmosphere and since nothing is added to the animal trimmings during processing. By limiting access to the atmosphere, oxidation of the meat can be limited thereby reducing or eliminating off flavors.

Figure 1:
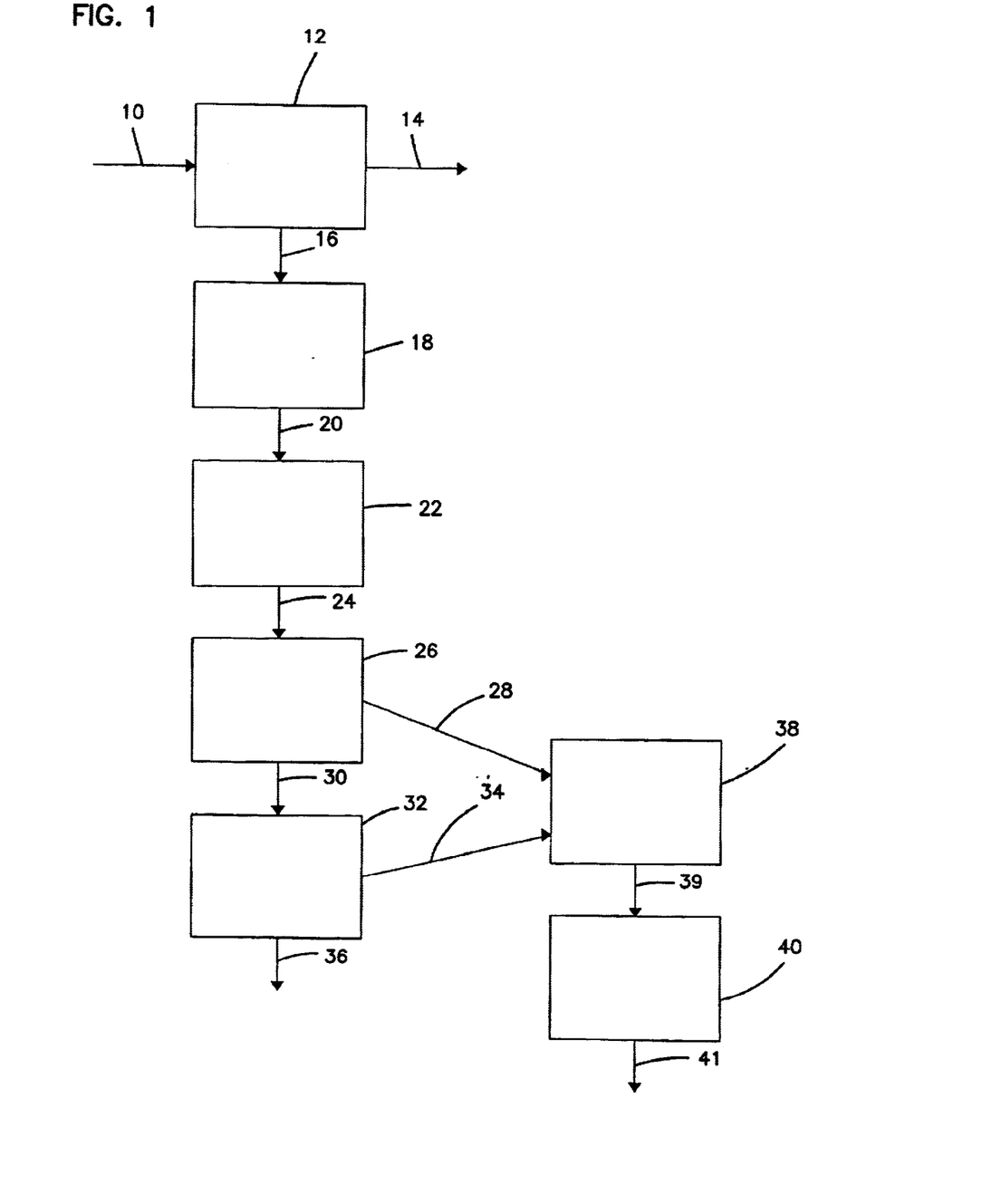
FIG. 1 is a flow diagram illustrating an embodiment of the low temperature rendering process according to the present invention.

A preferred embodiment of the invention is described in reference to FIG. 1 which provides a diagrammatic illustration of a continuous low temperature rendering process for converting animal trimmings to meat product. It should be appreciated that the method of the invention can be adapted to handle a wide range of throughput rates of animal trimmings. It is particularly desirable for the process to handle the supply of animal trimmings as they are generated in a packing house. For purposes of the following description of a preferred embodiment, beef trimmings containing an average of 61% by weight fat can be processed at a rate of 167 lbs/min. according to the present invention.

Boneless beef trimmings 10 at between about 0° C. and about 10° C. are fed to a desinewing apparatus 12 which removes the heavy connective tissue, ligaments, tendons, and the like if they are present This is referred to as the desinewing step which separates the low quality protein fraction (sinew) from the high quality protein fraction (skeletal muscle). The sinew 14 is discarded, and the desinewed beef trimmings 16 is subsequently processed to remove fat The desinewing apparatus 12 is preferably a commercially available Simo Industries 290/125-7PX Pump Deboner modified to include a screen having 0.5 mm rectangular openings to remove heavy connective tissue. It should be appreciated that the invention can be practiced without the step of desinewing.

The desinewing step may or may not remove all of the connective tissue. Generally, the desinewing step removes a large amount of the low quality protein component from the animal trimmings. For the above exemplary embodiment, the desinewing step removes 12.9 lbs/min. of sinew and causes the beef trimmings to increase in temperature by about 2–4° C. to about 7° C. to about 9° C. (about 46–48° F.) The desinewing step is preferably fairly quick and, for the above exemplary embodiment, takes less than one minute for a given volume of animal trimmings. In addition to removing sinew, the desinewing step reduces the viscosity of the animal trimmings which facilitates flow thereof through a pipe.

By separating the sinew 14 from the beef trimmings 16, the proportion of essential amino acids to total amino acids in the final meat product can be increased. Accordingly, it should be appreciated that the essential amino acids content and the protein efficiency ratio of the final meat product can be adjusted, as desired, based upon the desinewing step.

The desinewed beef trimmings 16 are fed to a heat exchanger 18 and heated to about 42° C. (about 108° F.) to melt the fat. The fat component of the desinewed beef trimmings 16 generally begins to melt at about 33° C. (about 92° F.), and becomes almost liquid at about 42° C. when it exits the heat exchanger 18 as liquified desinewed beef trimmings 20. The dimensions of the heat exchanger should be sufficient to provide liquified desinewed beef trimmings without significantly cooking or denaturing the protein. In the above exemplary embodiment, the heat exchanger 18 is a jacketed pipe, 2–3 inches in diameter and approximately 900 feet long with water introduced at about 46° C. (about 115° F.) circulating in the jacket to heat the desinewed meat, and the beef trimmings experience a residence time in the jacketed pipe heat exchanger 18 of about 14 to 16 minutes.

It should be appreciated that a shorter heat exchanger could be used. However, a shorter heat exchanger may require warmer water in the jacket to provide sufficient heating. If the water is too warm, the risk of overheating the desinewed beef trimmings increases. For example, a heat exchanger about 300 feet long may require water entering the jacket at about 63° C. (about 145° F.) which could, on occasion, result in overheating.

The heat exchanger 18 can be described as having a first-in and first-out arrangement. This means that substantially all of the desinewed beef trimmings are processed in the heat exchanger for about the same length of time. In other words, the desinewed beef trimmings flow through the heat exchanger without significant amounts remaining in the heat exchanger for extended periods of time compared with similarly processed desinewed beef trimmings. This ensues that the beef trimmings are consistently heated and that certain fractions of the beef trimmings do not remain in the heat exchanger too long resulting in denaturing or cooking thereof. In addition, first-in and first-out processing reduces potential bacterial buildup which would otherwise occur in animal trimmings heated for an extended period of time. It should be appreciated that this type of processing is advantageous over prior art vat or kettle-type heat exchangers which allow certain portions of beef to remain therein for too long. In addition, many prior art vat or kettle-type heat exchangers are open to the atmosphere which allows the beef to be oxidized, resulting in deterioration thereof.

It should be appreciated that the entire low temperature rendering process can be substantially a first-in and first-out arrangement and can be substantially closed from the atmosphere. Certain steps in the process, however, may not be completely first-in and first-out. For example, during centrifuging, portions of the separation stream may remain in the separator for slightly longer periods of time. These separators, however, are preferably designed to provide first-in and first-out operation. Since, the entire low temperature rendering process of the present invention can be enclosed, the extent of oxidation can be reduced, and bacterial growth and contamination can be reduced Furthermore, by processing the animal trimmings in a first-in and first-out arrangement, it is possible to reduce or eliminate portions of the processing material which is subjected to extended heating or processing.

The liquified desinewed beef trimmings 20 leaves the heat exchanger at a temperature of about 42° C. in the form of a slurry, and is fed into a particle reducer 22 where the particle sizes in the slurry are reduced to form a dispersion 24 having a roughly uniform consistency. The particle reducer 22 can be a Commitrol particle reducer manufactured by Urschel Laboratories Co.

The dispersion 24 is fed to a decanter 26 which provides for solids/liquids separation into a decanter solids stream 28 containing an increased weight percent of protein and moisture compared with the dispersion 24, and a decanter liquids stream 30 containing an increased weight percent of tallow, water soluble protein, and moisture compared with the dispersion 24. It should be appreciated that in the context of this invention, the use of the phrase "an increased amount" refers to an increased weight percentage of a particular component relative to the weight percentage of that component prior in the stream prior to being subjected to a separation step.

In the above exemplary embodiment, the decanter 26 is a CA-405 Decanter sold by Westfalia Separator AG, modified to provide a bowl which is designed to accommodate a high solids load, and which has a soft stream inlet to reduce shearing. The soft stream inlet is preferable since it reduces the amount of shear which would cause protein and fat to emulsify thereby reduce separation of fat and protein. Thus, the soft stream inlet is designed to accelerate the stream to about the same speed as the mass in the decanter prior to mixing. In addition, the overall design of the decanter 26 should provide for sanitary processing, which includes sanitary and accepted construction materials, first-in and first-out processing, and "clean in place" capabilities.

The decanter liquids stream 30 containing an increased amount of tallow, water soluble protein, and moisture is subjected to liquid/liquid separation in a separator 32 to provide a separator heavy phase stream 34 containing an increased amount of moisture and water soluble protein, and a separator light phase stream 36 containing an increased amount of tallow. The separator 32 is preferably a Westfalia RSD 300-96-777 Clarifier, sold by Westfalia Separator AG, which is modified so that the bottom disk is slightly reduced in diameter. Alternatively, the separator can be a Westfalia RSA-450 Separator modified to provide a disc stack to accommodate a higher solids load, or a Westfalia MSD-60 Clarifier. It is believed that the Westfalia RSD 300-96-777 Clarifier provides a greater degree of separation and is capable of handling a greater total processing volume.

The separator heavy phase stream 34 is combined with the decanter solids stream 28 at a mixing point 38 to form a finished product 39 having low fat content and a high essential amino acid content The separator light phase stream 36 can be further proceed to provide an edible rendering which can be referred to as edible tallow. This usually involves removing moisture therefrom using additional heating and centrifugation.

It should be appreciated that the separation steps of the present invention do not provide complete or total separation of protein and fat, or of solids and liquids, etc. Accordingly, it is believed that each stream from a separation step contains a greater (or increased) amount of certain components and a lesser (or decreased) amount of other components.

The finished product 39 is quickly cooled or frozen on a freeze apparatus 40 which can be a Freeze Wheel System sold by Reno Technology. The cooled or frozen beef product 41 is then packaged for storage or sale. Alternatively, the beef product can be combined with other beef to provide ground beef.

The total time for processing through the low temperature rendering process of the present invention is preferably less than 30 minutes (from desinewing to freezing or final cooking temperature), and more preferably less than 25 minutes.

For the above exemplary embodiment where beef trimmings containing an average fat content of 61% by weight are fed into the above described low temperature rendering process at a rate of about 167 lbs./min., about 44 lbs./min. of frozen beef product can be obtained. This corresponds with a production rate of about 13 lbs./min. of sinew, and about 109 lbs./min. of tallow to rendering. The separation steps provide a decanter solids stream of about 28 lbs./min., and a heavy phase of about 17 lbs./min. The content of the various streams throughout the above-described low temperature rendering process are provided in Table 1.

TABLE 1

|  | Fat % | Moisture % | Protein % | EAA % |
|---|---|---|---|---|
| Decanter Solids | 7.79 | 66.47 | 25.06 | 29.75 |
| Decanter Liquids | * | 19.79 | * | * |
| Separator Heavy Phase | 1.08 | 88.86 | 8.16 | 41.3 |
| Separator Light Phase | * | .78 | * | * |
| Finished Product | 3.74 | 75.91 | 19.66 | 34.8 |

*Sample not analyzed for identified component

Applicants believe that an important aspect of the invention is the step where the decanter solids stream containing an increased amount of moisture and protein is combined with the separator heavy phase containing an increased amount of moisture and water soluble protein to provide a meat product. As demonstrated by the data in Table 1, this step increases the essential amino acid content while further decreasing the fat content compared to the decanter solids stream In addition, this step provides a fat content of less dan 30% by weight; a protein content of greater than 14% by weight; a protein efficiency ratio (PER) of 2.5 or higher, or an essential amino acids (EAA) content of 33% of the total amino acids or higher. Advantageously, it is possible to provide a fat content of less than 20% by weight, more preferably less than 10% by weight, even more preferably between about 1 and 7% by weight, and most preferably between about 2 and 5% by weight In addition, it is possible to provide a protein content of preferably greater, than 18% by weight, and more preferably greater than 20% by weight.

For processing beef trimmings according to the present invention, it is believed that the preferred content, by weight, of fat, moisture, and protein at the stages of separation for the decanter and separator, and for the final product, are provided in Table 2. It is additionally believed that pork trimmings can be processed to provide the same ranges of fat, moisture and protein.

TABLE 2

|  | Fat % | Moisture % | Protein % | EAA |
|---|---|---|---|---|
| Decanter Solids | 4.5 to 8.5 | 63 to 69 | 22 to 26.5 | 28.5 to 31 |
| Decanter Liquids |  | 16 to 24 |  |  |
| Separator Heavy Phase | .75 to 2.0 | 86 to 92 | 6 to 9.5 | 39.5 to 42.5 |
| Separator Light Phase |  | .15 to 2.0 |  |  |
| Finished Product | 1 to 7 | 72 to 77 | 18 to 21 | >33% |

The starting material for use in the present invention is preferably boneless beef or pork trimmings. It should be understood, however, that the present invention could be applied to animal trimmings containing undesirable components such as bone, cartilage, etc. In particular, it may be helpful to move the undesirable components at some stage during the process. An apparatus for seperating meat and bone which could be used in accordance with the present invention is described in U.S. Pat. No. 4,186,216 to Roth.

It is noted that it is desirable to quickly cool the protein to prevent deterioration. Certain government regulations require that the protein product be reduced to below about 5° C. (about 40° F.) within one-half hour of its separation from fat. To achieve optimum inhibition of bacteria growth, the product should be lowered to a temperature of from about −17° C. to about −12° C. (about 0°F. to about 10° F.). It is an advantage of the present invention that the method can be practiced without raising the temperature of the processed meat above about 43° C. (about 110° F.), and provides a frozen final product within about 30 minutes of processing. A refrigeration apparatus which can be used in the present invention is described by U.S. Pat. No. 4,098,095 to Roth, the disclosure of which is incorporated herein by reference.

The finely textured meat of the present invention can be used in ground beef without having to be declared on the label, and can be used, if desired, in additional products such as beef patties, sandwich steaks, taco filling, pizza topping, chili, beef sticks, ethnic entrees, meatballs, luncheon meat, fabricated roast beef, pepperoni, and the like.

ALTERNATIVE EMBODIMENTS

Figure 2:
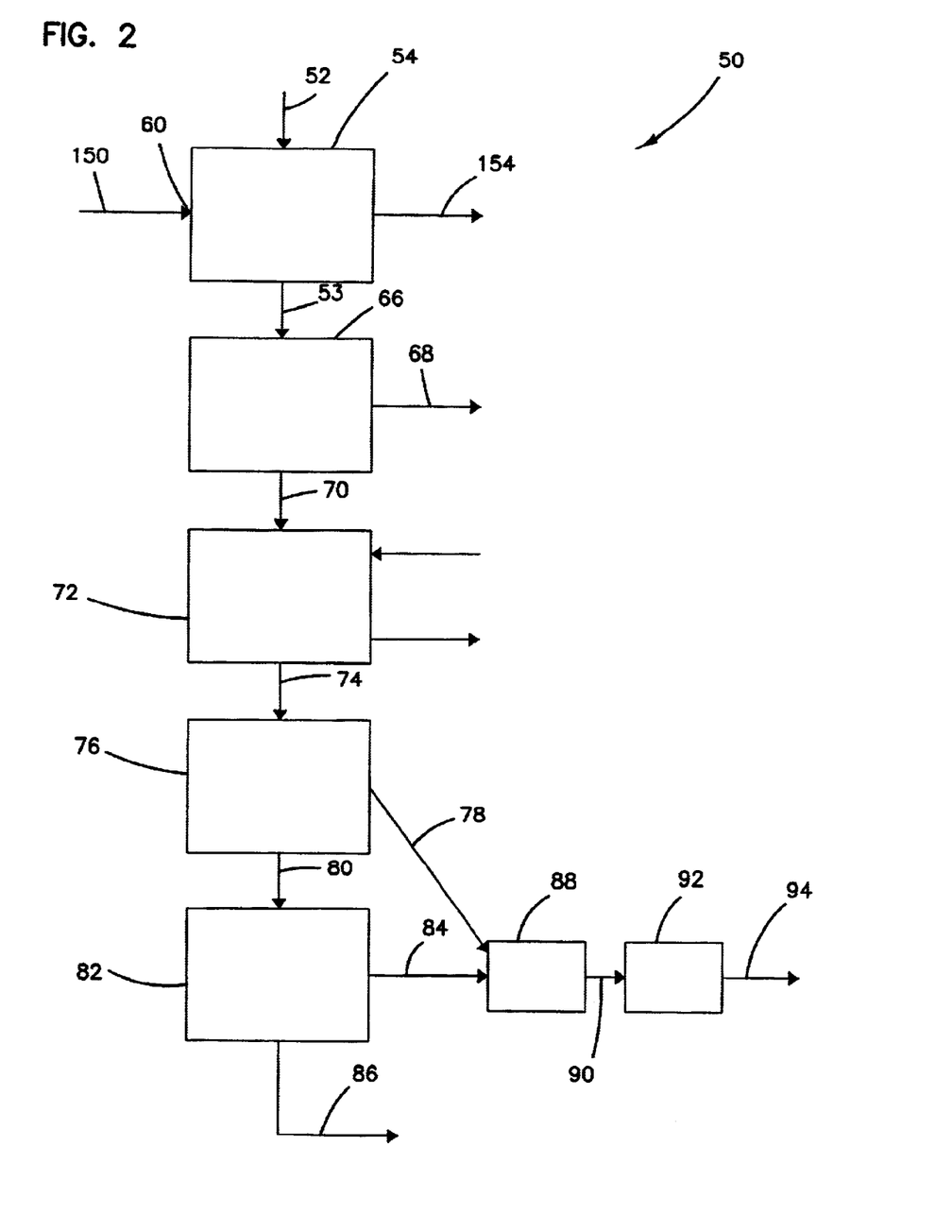
FIG. 2 is a flow diagram illustrating an alternative embodiment of the low temperature rendering process according to the invention.

Now referring to FIG. 2, an alternative embodiment of the low temperature rendering process of the invention is depicted at reference numeral 50. It should be understood that while the process is described with reference to many separate steps or operations, the invention does not require the practicing of all of the step or operations. For example, the process can be practiced without the step of desinewing if it is not necessary to remove the sinew from the tissue, or the step of freeing if the finely textured meat product can be cooled to a desired temperature without freezing.

It should be appreciated that the inventive process can be practiced with various animal trimmings including cattle, swine, sheep, poultry, horse and wild game. Preferably, the animal trimmings are beef trimmings. Animal trimmings 52 are introduced into a pasteurization unit 54 to kill at least a portion of the bacteria which may be provided on the surface of the trimmings 52. It should be understood that the trimmings processed by the present invention need not contain bacteria on its surface although it is believed that a certain level of bacteria may be present as a result of the slaughter and fabrication operations which results in the trimmings for processing by low temperature rendering. To the extent that pathogenic bacteria may be present on the surface of the trimmings, the pasteurization unit 54 is provided to kill such bacteria Now referring to FIG. 3, a schematic diagram of a preferred embodiment of the method and apparatus for surface treating animal trimmings is provided at reference numeral 10. It should be appreciated that while the pasteurization is described in the context of surface treating animal trimmings, the surface treatment is provided to reduce pathogenic bacterial populations on the surface of animal trimmings if such bacterial populations are present. It is not necessary that a particular animal trimmings which is processed according to the invention contains at least a minimal amount of pathogenic bacteria It is expected that most animal trimmings processed according to the invention will be essentially free of pathogenic bacteria In the context of processing animal trimmings for human consumption, it is expected that there may be a possibility, at some time, that pathogenic bacteria may exist on the surface of the animal trimmings. Accordingly, the present invention is provided to destroy bacterial populations, if they exist, before the animal trimmings is further processed or reaches the consumer.

It should be appreciated that the phrase "animal trimmings" can include relatively small portions of tissue obtained as a result of the slaughter and fabrication operation. In general, these small portions include trimmings from animal carcasses. It is expected that the small portions of animal trimmings will have a size ranging from about 0.5 inch to about 16 inches in length. It should be understood the length of animal trimmings refers to the longest dimension. In general, the animal trimmings which can be processed according to the invention will generally have an average weight of between about 0.25 lbs and about 12 lbs. per tissue piece. Animal trimmings can be obtained from several types of animal species including cattle, swine, sheep, poultry, horse, and wild game.

Figure 3:
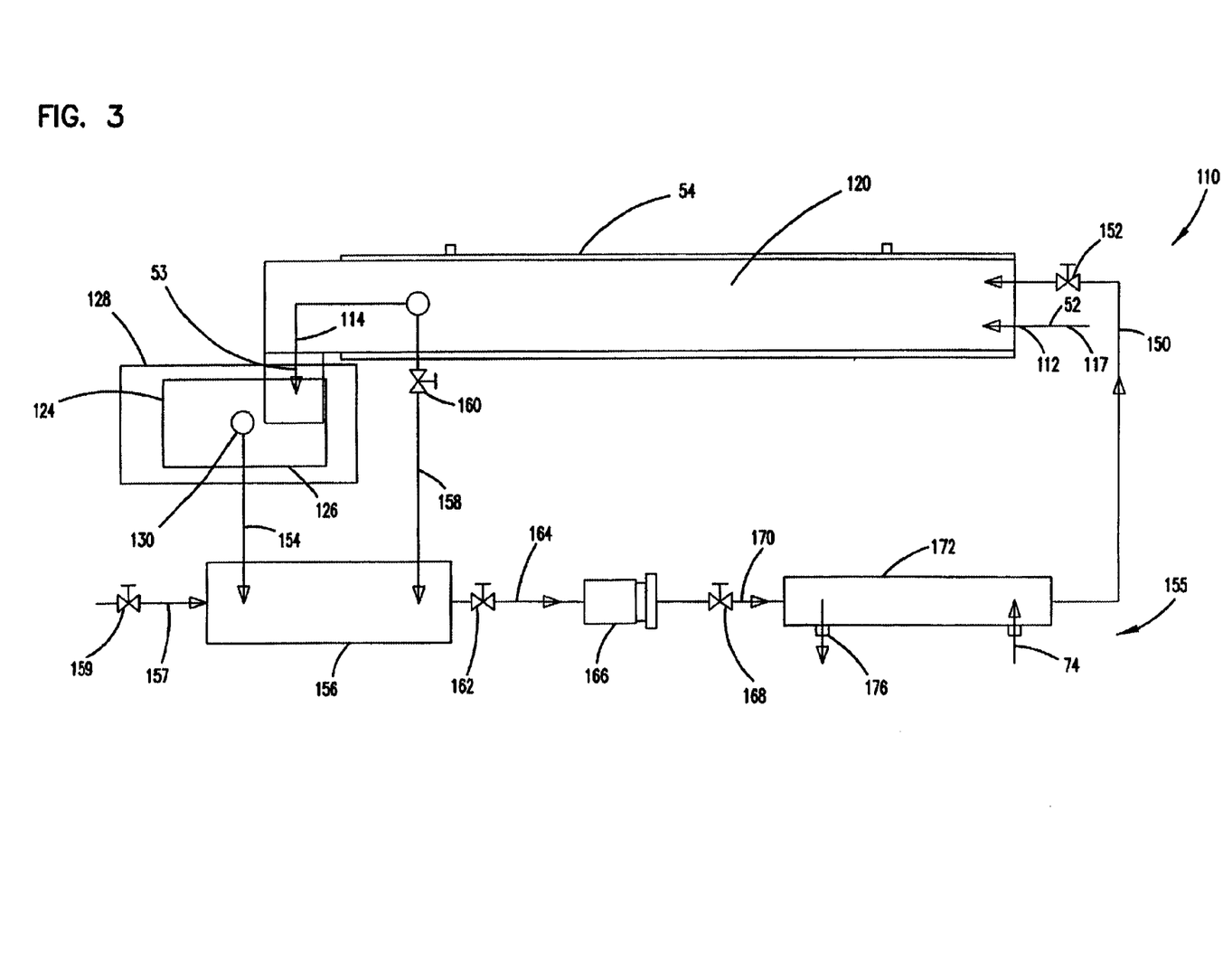
FIG. 3 is a schematic plan view of the method and apparatus for surface treating animal tissue provided in FIG. 2.

The apparatus for surface treating animal trimmings 110, according to the invention, includes a tissue inlet 112, a tissue outlet 114, and a surface treating or pasteurization unit 54. It should be appreciated that the invention relates to the processing of animal trimmings 52 to increase the degree of certainty that pathogenic bacterial populations are sufficiently reduced or lowered thereby increasing the overall safety of the animal trimmings as a food product, or as a pharmaceutical or animal feed product.

The animal trimmings are continuously introduced into the pasteurization unit 54 at the tissue inlet 112. The animal trimmings 52 is provided by a conveyor 117 and dropped into the hot heat transfer fluid or media 120 within the pasteurization unit 54. The hot heat transfer media is preferably provided at a temperature which is sufficient to kill pathogenic bacterial populations which may be present on the surface of the animal trimmings 116 in the amount of time the tissue is provided within the pasteurization unit 54. In the case of water, a preferred heat transfer media, the water should be provided at a temperature of between about 80° C. and about 110° C. in order to provide desired lethal action on the bacterial populations which may be present on the surface of the animal trimmings.

As the animal trimmings 52 pass through the pasteurization unit 54, it is expected that the animal trimmings may pick up water (or other heat transfer media) during the heat treatment process. The heat treated tissue 53 is recovered from the pasteurization unit 54 and passes through a strainer 124 where the heat transfer fluid, such as water, is allowed to drain therefrom. Preferably, the strainer 124 includes a drain screen 126 and a shaker 128. While the heat treated tissue 53 is provided in the strainer 124, the agitation created by the shaker 128 causes excess heat transfer fluid to drain into a fluid catch pan 130 where it is subsequently removed via the fluid discharge line 154.

The heat treated tissue 53 which is recovered from the pasteurization system 110 can then be processed into edible products for human consumption.

Now referring to FIG. 2, the trimmings 53 which are processed through the pasteurization unit 54 can then be subjected to desinewing in a desinewing apparatus 66. The desinewing apparatus 66 removes the heavy connective tissue, ligaments, and tendons, if they are present. This is referred to as the desinewing step which separates the low quality protein fraction (sinew) from the high quality protein fraction (skeletal muscle). The sinew 68 can be discarded, and the desinewed trimmings 70 are processed to remove fat. The desinewing apparatus 66 is preferably a Simo Industries 290/125-7PX Pump Deboner. Of course, the desinewing step is optional, and the invention can be practiced without the step of desinewing.

The desinewing step may or may not remove all of the connective tissue. Generally, the desinewing step removes a large amount of the low quality protein component from the animal trimmings. The desinewed trimmings 70 are fed to a heat exchanger 72 and heated to about 42° C. to melt the fat The fat component of the desinewed trimmings 70 generally begins to melt at about 33° C., and becomes almost liquid at about 42° C. when it exits the heat exchanger 72 as liquified trimmings 74. The dimensions of the heat exchanger 72 should be sufficient to provide liquified trimmings 74 without significantly cooking or denaturing the protein.

Preferably, the heat exchanger is identical or similar to the heat exchanger described above. Preferably, the heat exchanger 72 has a first-in and first-out arrangement which means that substantially all of the trimmings are processed in the heat exchanger for about the same length of time to ensure that the trimmings are consistently heated and that certain fractions of the trimmings do not remain in the heat exchanger too long resulting in denaturing or cooking thereof.

The liquified trimmings 74 leave the heat exchanger at a temperature of about 42° C. in the form of a slurry. Optionally, the liquified trimmings 74 can be fed to a particle reducer such as a Commitrol particle reducer where the particle sizes in the slurry are reduced to form a dispersion having a roughly uniform consistency.

The liquified trimmings 74 are fed to a decanter 76 which provides for solids/liquids separation into a decanter solids s 78 containing an increased weight percent of protein and moisture compared with the liquified trimmings 74, and a decanter liquids stream 80 containing an increased weight percent of tallow, water soluble protein, and moisture compared with the liquified trimming 74.

The decanter liquids stream 80 is subjected to liquid/liquid separation in a separator 82 to provide a separator heavy phase stream 84 containing an increase amount of moisture and water soluble protein, and a separator light phase stream 86.

The separator heavy phase stream 84 is combined with the decanter solids stream 78 at a mixing location 88 to form a finished product 90 having low fat content and a high essential amino acid content.

The separator light phase stream 86 can be recovered and processed to provide an edible rendering which can be referred to as edible tallow.

The finished product 90 can be quickly cooled or frozen on a freeze apparatus 92. The cooled or frozen product 94 can be packaged for storage or sale.

The total time for processing through the low temperature rendering process of the present invention is preferably less than 30 minutes (from surface treating to freezing or cooling to a desired temperature), and more preferably less than 20 minutes. The step of cooling and/or freezing takes about 1 minute.

Figure 4:
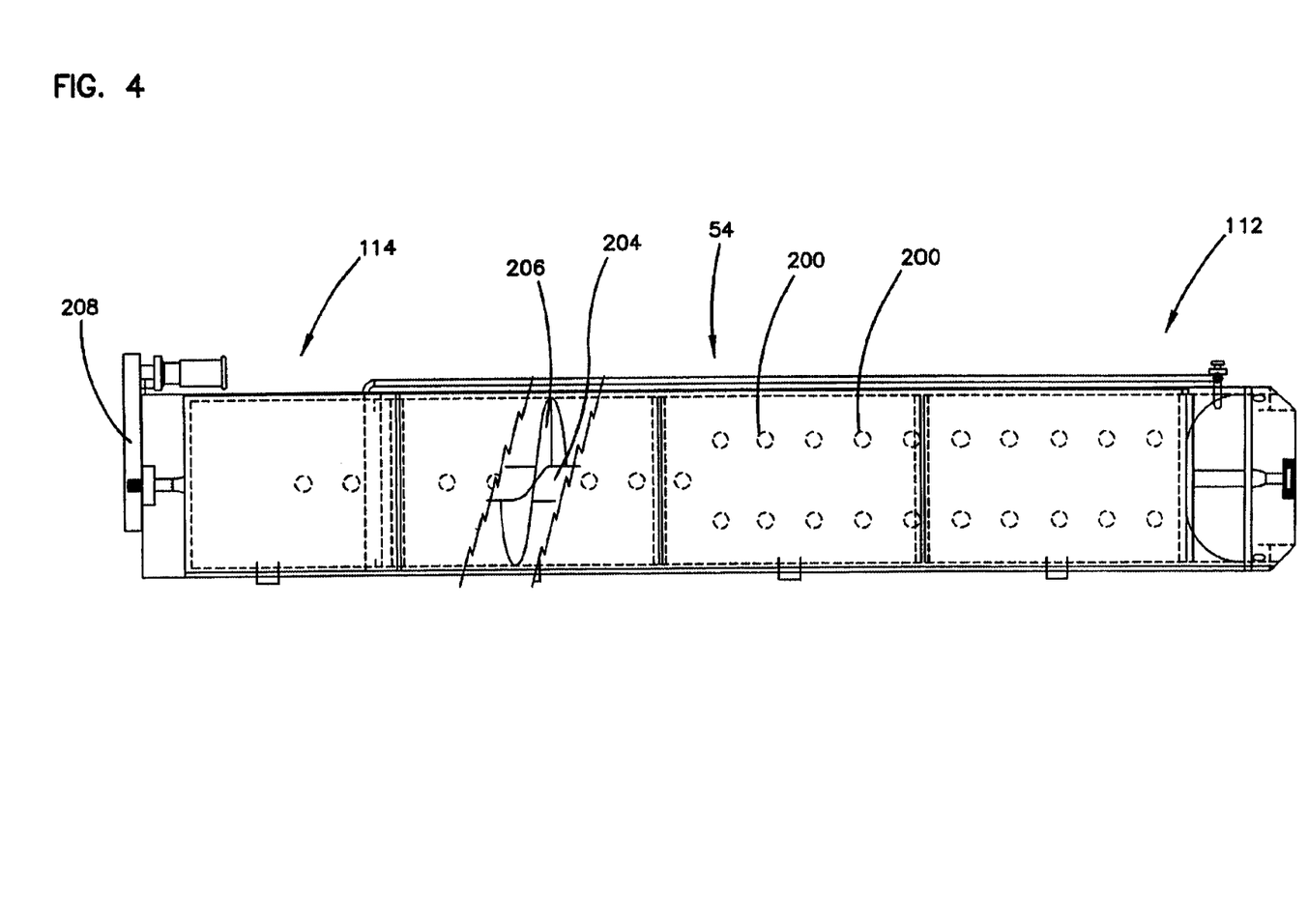
FIG. 4 is a top plan view of the pasteurization unit of FIG. 3.
Figure 5:
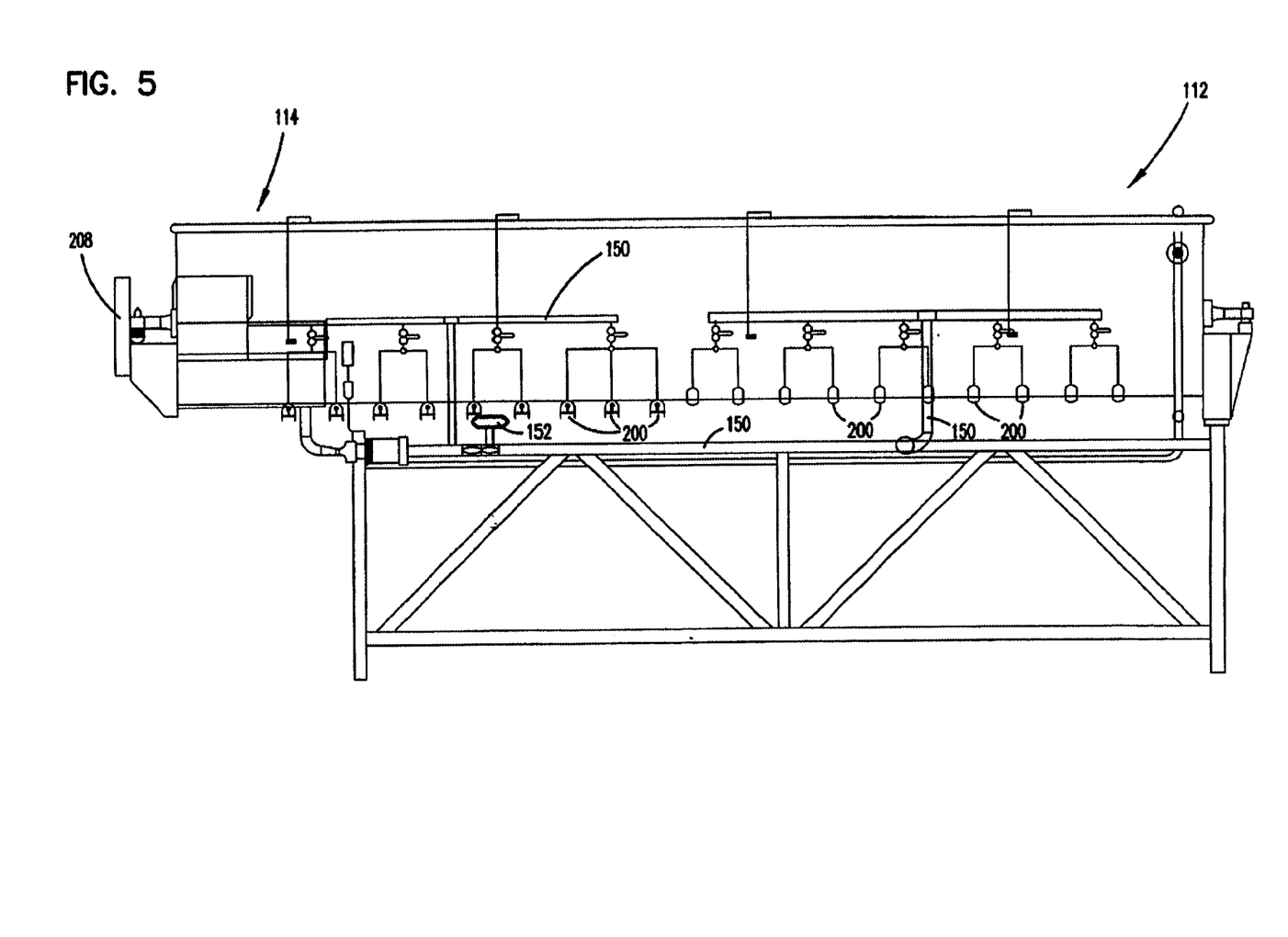
FIG. 5 is a side view of the pasteurization unit of FIG. 3.

Now referring to FIGS. 3–5, the pasteurization of the animal trimmings is described in more detail. While the invention is described in the context of using water as the heat transfer fluid or media, it should be appreciated that other media, including tallow, could be used. The water temperature provided within the pasteurization unit 54 is preferably provided within a range of between about 80° C. and about 110° C. Applicants have discovered that by providing the water at a temperature within this range, and that by providing the animal trimmings 52 within the pasteurization unit 54 for between about 25 and about 50 seconds, the desired degree of pasteurization of the surface of the animal trimmings 52 can be obtained. Hot water is fed to the pasteurization unit 54 through the hot water inlet line 150. The flow of the hot water through the inlet line 150 is controlled by the flow adjusting valve 152. Water is recovered from the pasteurization unit 54 via water discharge line 154. Because the pasteurization unit 54 runs at steady state, the introduction of a mass of water into the pasteurization unit causes the removal of the same mass of water therefrom. Water can leave the system as vapor and a certain amount of water is expected to be absorbed by the animal trimmings 52. The remaining amount of water flows out of the pasteurization unit along with the heat treated tissue 53 and is recovered in the catch pan 130. Water recovered in the water catch pan 130 then flows via water discharge line 154 into surge tank 156. An additional fluid recovery line 158 is provided. When the valve 160 is open, water within the pasteurization unit 54 flows into the surge tank 156. This allows for easy draining of the pasteurization unit 54 for cleaning.

The water which is introduced into the pasteurization unit 54 and recovered therefrom can be referred to as processing water. While the embodiment of the invention depicted in FIG. 1 includes a recycle stream 155 for the processing water, it should be appreciated that the invention can be practiced without the recycle stream. That is, processing water from the pasteurization unit 54 can be discarded, and fresh heed water can be introduced into the pasteurization unit 54. Furthermore, the surge tank 56 is advantageous for allowing fat buildup in the processing water to overflow. To assist the overflow of fat, water can be added via line 157 at a rate controlled by the valve 159 to cause overflow of excess fat from the surge tank 156. In addition, the line 157 can be relied upon for introducing water for making up the water which is evaporated or otherwise lost during the processing.

The processing water recovered in the surge tank 156 and the make up water are processed and introduced into the pasteurization unit 54 for further processing of animal trimmings 52. A valve 162 is provided which controls the flow of water through the pump inlet line 164 and into the recirculation pump 166. Under pressure, water then passes through valve 168 and pump outlet line 170 and then through the heat exchanger 172. The heat exchanger 172 includes a steam inlet 174 and a condensation outlet 176 for heating the water. Heated water 178 then flows out of the heat exchanger 172 for introduction into the pasteurization unit 54.

Now referring to FIGS. 4 and 5, the pasteurization unit 18 is shown in detail. The hot water is introduced into the pasteurization unit 54 via injection ports 200. A greater number of injection ports 200 are provided near the tissue inlet 112 in order to control the temperature across the length of the pasteurization unit. Because the animal trimmings 52 are provided at a much lower temperature than the water within the pasteurization unit 54, additional energy or heat should be provided near the inlet region. Along the length of the pasteurization unit 54, a screw 204 is provided for advancing the animal trimmings 52 along the length of the pasteurization unit The screw 204 includes a spiral flight 206. As the screw 204 rotates, the spiral flight 206 causes the animal trimmings 52 to move along the length of the pasteurization unit 54. This causes the animal trimmings 52 to advance through the pasteurization unit 54 on a first in first out basis thereby preventing overtreatment of certain pieces of animal trimmings 52. The speed of the screw 204 is adjusted to provide the desired residence time within the pasteurization unit 54. It should be appreciated that the desired residence time is a function of the temperature of the water within the pasteurization unit 54. In the case of water provided at a temperature of between about 80° C. and about 110° C., it is desirable to provide a residence time of between about 25 seconds and about 50 seconds, and more preferably between about 30 seconds and about 45 seconds. For a screw having a solid flight at a 12 inch pitch, this relates to a screw speed of 8–9 revolutions per minute for a pasteurization unit having a length of about 10 feet. The screw 204 preferably driven by a variable speed motor 208 which can be adjusted to provide the desired tissue retention time within the pasteurization unit 54.

At the outlet end of the pasteurization unit 54, the final edge of the flight pushes the animal trimmings above the water level and out onto the strainer 24. The water is then recovered and recirculated into the pasteurization unit 54. The heat treated tissue 53 is then recovered and further processed by, for example, those techniques previously described.

It should be appreciated that the purpose of the pasteurization unit is to provide a relatively fast heat treatment of the animal trimmings in order to reduce the incidence of pathogenic bacteria while retaining he desired organoleptic properties of the animal trimmings. In particular, it is desirable to provide at least one log reduction in the aerobic plate counts on the surface of the animal trimmings, and to provide at least a two log reduction in pathogenic bacteria when tested using inoculated samples. It is expected that the animal trimmings will pick up a certain amount of water as a result of the processing. It is desired, however, that this increase in weight is minimal.

It should be appreciated that the invention provides for the surface treatment of the animal trimmings. It is not desirable to treat the animal trimmings to a depth below about 4 mm from the surface of the animal trimmings. It is expected that if surface treatment extends beyond about 4 mm, the organoleptic properties of the animal trimmings may be compromised.

An alternative way of characterizing the surface treatment of animal trimmings within the pasteurization unit is in terms of the ratio of the flow rate of heated water into the pasteurization unit to the flow rate of animal trimmings into the pasteurization unit. In order to provide desired degree of surface treatment of the animal trimmings, enough heat energy needs to be introduced into the pasteurization unit. Too much heat energy, however, will result in cooking the animal trimmings or deterioration of organoleptic properties of the animal trimmings. It should be appreciated that the desired flow ratio of water to animal trimmings is a function of the temperature of the water bath within the pasteurization unit, the length of time the animal trimmings will remain within the pasteurization unit, and the temperature of the animal trimmings upon entry into the pasteurization unit In the case of poultry, the animal trimmings is often processed relatively shortly after the slaughter operation. Accordingly, the temperature of poultry which has been recently slaughtered and after removal of the feathers is between about 30° C. and about 40° C. In contrast beef trimmings are generally cooled or chilled to a temperature of between about 0° C. and about 10° C. prior to introduction into the pasteurization unit It should be appreciated that a higher flow rate of water may be appropriate for a lower temperature animal trimmings. In contrast, a lower flow rate of water may be appropriate for a hotter temperature animal trimming. Furthermore, the flow rate of water will be affected by the temperature of the water introduced into the pasteurization unit and the temperature of the water maintained within the pasteurization unit. In general under conditions of providing a bath at between about 80° C. and about 110° C. and introducing animal trimmings at a temperature of between about 0° C. and about 40° C., it is desirable to provide a flow rate ratio of water to animal trimmings of between about 0.05 gallon of water per pound animal trimmings to about 0.2 gallon of water per pound animal trimmings. Preferably, the flow ratio is between about 0.10 gallon of water per pound animal trimmings and about 0.15 gallon of water per pound of animal trimmings. Applicants have found that a most preferred flow ratio is between about 0.11 gallon of waterer pound of animal trimmings and about 0.13 gallon of water per pound of animal trimmings.

By way of illustration, the pasteurization unit can be used to process 14,000 pounds of animal trimmings per hour and provided at a temperature of between about 0° C. and about 10° C. by introducing 1700 gallons of water provided at a temperature of between about 80° C. and about 110° C. It is expected that with such a flow rate of water, about 1550 gallons per hour will be provided as recirculated water, and about 150 gallons per hour will be provided as make-up water. Surface treating about 10,000 pounds per hour provided at a temperature of between about 0° C. and about 10° C. can include introducing about 1100 gallons of water per hour provided at a temperature of between about 80° C. and about 110° C. Of that amount, about 1000 gallons can be recirculated water and about 100 gallons can be make-up water.

While a preferred embodiment of the invention is described in the context of hot water as a heating media, it should be appreciated that other types of heating media can be used according to the invention In general, it is preferable to use a heating media which provides sufficiently fast heat transfer to the surface of the animal trimmings. The heating media can be referred to as the bath The heat transfer coefficient of a media reflects the relative ability of the media to transfer its heat energy to another substance. The heat transfer coefficient of boiling water is significantly higher than convective oil. The average heat transfer coefficient for boiling water is 20 times greater than for convective oil. In the situation where tallow is used as the heating media and here it is provided at a temperature in the range of between about 80° C. and 110° C., it may be appropriate to surface treat animal trimmings for between about 25 seconds and 150 seconds. Because the heat transfer coefficient of tallow is less than the heat transfer coefficient of water, it may be appropriate to alternatively increase the temperature of the tallow to provide the desired lethal effect under treatment times similar to that used when water is the heating media.

Preferred heat transfer fluids include tallow and water. In the case where the heat transfer fluid is tallow, it can be obtained from a later step in the low temperature rendering operation as described below. That is, the tallow can be recovered from a later separation step and provided into the past ion unit 54 as the heat wander fluid 56 for surface treating the trimmings 52. When tallow is provided as the heat transfer fluid, it is preferably provided at a temperature which is greater than about 100° C., and preferably between about 115° C. and about 150° C. When water is provided as the heat transfer fluid, it is preferably provided at a temperature below its boiling point and preferably at a temperature of between about 80° C. and about 95° C., and more preferably between about 82° C. and about 93° C.

While the invention has been described in conjunction with specific embodiments thereof, it is evident that different alternatives, modifications, variations, and uses will be apparent to those skilled in the art in view of the foregoing description. Accordingly, the invention is not limited to these embodiments or apparatus presented herein.

What is claimed is:

1. A low temperature rendering process for converting animal trimmings to meat product, said low temperature rendering process comprising steps of:

(a) surface treating animal trimmings in a bath with a heat transfer fluid provided at a temperature between about 80° C. and about 150° C. for between about 25 seconds and about 150 seconds to provide surface treated animal trimmings;

(b) heating said surface treated animal trimmings in a heat exchanger having a first in and first out arrangement to a temperature in the range of about 30° C. and about 50° C. to form a heated slurry; and (c) separating the heated slurry into a solids stream and a liquids stream, the solids stream containing an increased weight percent of protein compared with the weight percent of protein and moisture in the heated slurry, and the liquids stream containing an increased weight percent of tallow and water soluble proteins, and moist compared with the weight percent of tallow and water soluble protein, and moisture in said heated slurry.

2. A low temperature rendering process according to claim 1, further comprising a step of:

(a) feeding the liquids stream from the decanter to a separator and separating the liquids stream into a heavy phase and a light phase, the heavy phase containing an increased weight percent of moisture and water soluble proteins compared to the weight percent of moisture and water soluble proteins in the liquids stream, and the light phase containing an increased weight-percent of tallow compared with the weight percent of tallow in the liquids stream.

3. A low temperature rendering process according to claim 2, further comprising a step of combining the solids stream and the heavy phase to provide a meat product.

4. A low temperature rendering process according to claim 3, wherein said meat product has a fat content of less than about 30%; a protein content of greater than about 14%; and a protein efficiency ratio of about 2.5 or higher or an essential amino acid content of at least 33% of the total amino acids.

5. A low temperature rendering process according to claim 3, wherein said meat product has an essential amino acids content of at least 33% of the total amino acids.

6. A low temperature rendering process according to claim 1, wherein the heat transfer fluid comprises water.

7. A low temperature rendering process according to claim 6, wherein the heat transfer fluid is provided at a temperature of between about 82° C. and about 93° C.

8. A low temperature rendering process according to claim 1, wherein the heat transfer fluid comprises tallow.

9. A low temperature rendering process according to claim 8, wherein the heat transfer fluid is provided at a temperature greater than about 100° C.

10. A low temperature rendering process according to claim 8, wherein the heat transfer fluid is provided at a temperature of between about 115° C. and about 150° C.

11. A low temperature rendering process according to claim 11, wherein the step of separating a solids stream and a liquids stream from the heated slurry is provided by a decanter.

12. A low temperature rendering process according to claim 1, wherein the meat product is frozen within about 30 minutes of said step of heating animal trimmings in a heat exchanger.

13. A low temperature rendering process according to claim 1, wherein the animal trimmings have a lean content of at least 37%, by weight.

14. A low temperature rendering process according to claim 1, wherein the animal trimmings have a lean content of at least 39%, by weight.

* * * * *

UNITED STATES PATENT AND TRADEMARK OFFICE
CERTIFICATE OF CORRECTION

PATENT NO. : 6,949,265 B1  Page 1 of 1
APPLICATION NO. : 09/708925
DATED : September 27, 2005
INVENTOR(S) : Schaefer et al.

It is certified that error appears in the above-identified patent and that said Letters Patent is hereby corrected as shown below:

Col. 15, lines 10-15, claim 1(c): "weight percent of protein and moisture in the heated slurry, and the liquids stream containing an increased weight percent of tallow and water soluble proteins, and moist compared with the weight percent of tallow and water soluble protein, and moisture in said heated slurry." should read -- weight percent of protein in the heated slurry, and the liquids stream containing an increased weight percent of tallow and water soluble proteins compared with the weight percent of tallow and water soluble proteins in said heated slurry. --

Col. 15, line 18, claim 2: "feeding the liquids stream from the decanter to a" should read -- feeding the liquids stream to a --

Col. 16, line 18, claim 11: "claim 11, wherein the step" should read -- claim 1, wherein the step --

Signed and Sealed this

Twelfth Day of February, 2008

JON W. DUDAS
*Director of the United States Patent and Trademark Office*